No. 633,805. Patented Sept. 26, 1899.
J. G. CHANDLER.
SYRINGE.
(Application filed Dec. 24, 1898.)
(No Model.)
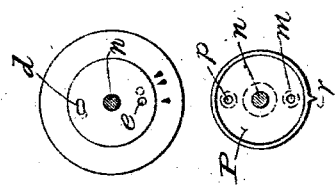
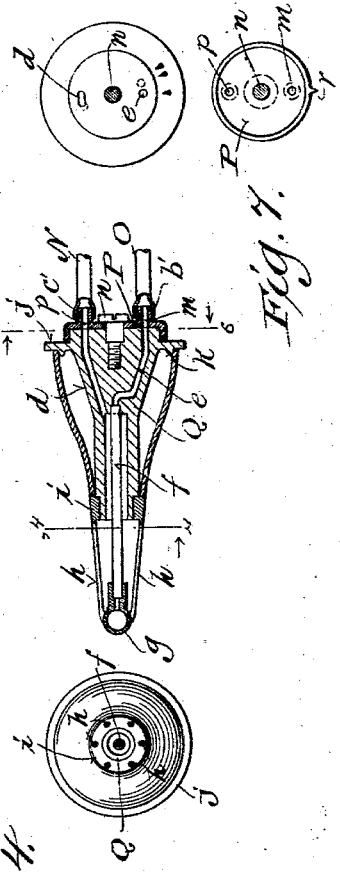
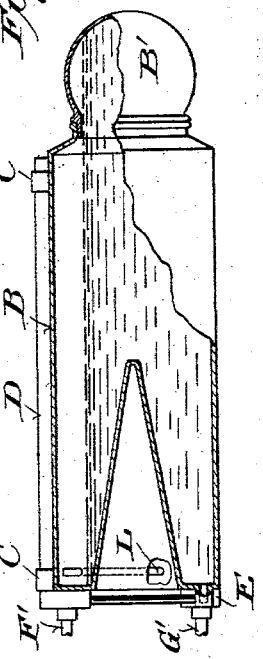
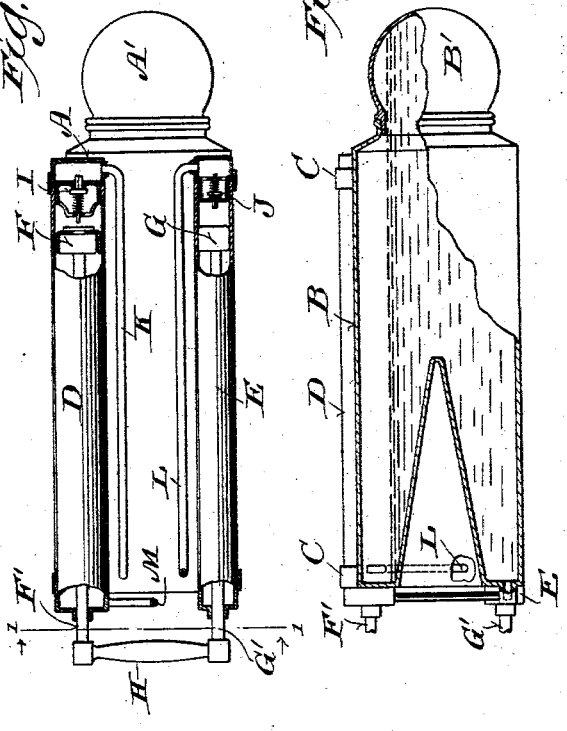
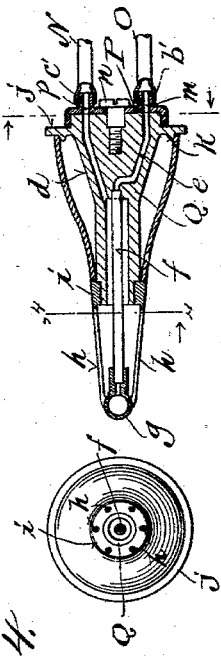
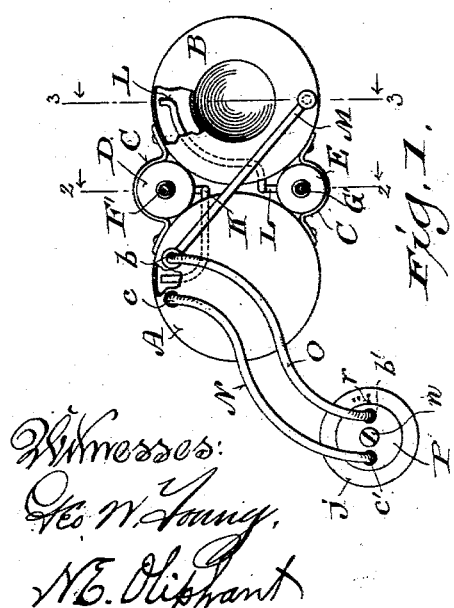
Witnesses:
Geo. W. Young,
N. E. Oliphant
Inventor
James G. Chandler
By H. G. Underwood
Attorney
THE NORRIS PETERS CO., PHOTO-LITHO., WASHINGTON, D. C.

UNITED STATES PATENT OFFICE.

JAMES G. CHANDLER, OF RACINE, WISCONSIN.

SYRINGE.

SPECIFICATION forming part of Letters Patent No. 633,805, dated September 26, 1899.

Application filed December 24, 1898. Serial No. 700,237. (No model.)

*To all whom it may concern:*

Be it known that I, JAMES G. CHANDLER, a citizen of the United States, and a resident of Racine, in the county of Racine and State of Wisconsin, have invented certain new and useful Improvements in Syringes; and I do hereby declare that the following is a full, clear, and exact description thereof.

My invention has for its main object to provide a simple economical syringe by which irrigation of natural human cavities and open wounds may be had without wetting bed-clothing under recumbent patients.

Therefore it consists in certain peculiarities of construction and combination of parts hereinafter particularly set forth with reference to the accompanying drawings and subsequently claimed.

Figure 1 of the drawings represents a front end elevation of my syringe apparatus, partly broken and in section, on the plane indicated by line 1 1 in the succeeding figure; Fig. 2, a partly-sectional view of a portion of the same in longitudinal elevation, this view being indicated by line 2 2 in the preceding figure; Fig. 3, a similar view indicated by line 3 3 in the first figure; Fig. 4, a transverse sectional view indicated by line 4 4 in the fifth figure; Fig. 5, a longitudinal section view of one form of nozzle applicable as part of the aforesaid apparatus; Fig. 6, a detail partly-sectional view indicated by line 6 7 in the fifth figure, and Fig. 7, a similar view indicated by line 7 6 in said fifth figure.

Referring by letter to the drawings, A B represent receptacles, herein shown as a pair of parallel cylinders, having rear head-openings closed by caps A' B', the latter being in water-tight screw-thread connection with said cylinders. The caps are preferably of the bulb or knob form shown to facilitate opening and closing of the cylinders. Intermediate of the cylinders and connected thereto by stay-straps C are upper and lower barrels D E, in which pistons F G are reciprocated, the rods F' G' of these pistons being joined to a single handle H, as shown in Fig. 2. Diaphragms in the barrels D E are provided with apertures controlled by check-valves I J, these valves being so disposed that when one is opened incidental to reciprocation of pistons F G the other is forcibly held upon its seat. In rear of valve I the barrel D is connected by a pipe K with the cylinder A, and another pipe L leads from barrel E in rear of valve J into cylinder B, the general assemblage being such that operation of the pistons F G exhausts air from the former cylinder and forces air into the other cylinder, the latter being the one employed to contain fluid. Cylinder B is provided with an outlet-pipe M, that is shown as terminating in a nipple *b* parallel to another nipple *c*, that pertains to cylinder A, and slipped on these nipples are flexible pipes N O, that also connect with nipples *b' c'*, extending rearward from a cut-off plate P for passages *d e* in the shank Q of a nozzle. Fitted in the nozzle-shank is a central pipe *f* in communication with the passage *e*, a spray-tip *g* in slip-fit on the latter pipe being joined by wires *h* to a ring *i* in screw-thread connection with said shank, the latter having a central recess surrounding pipe *f* and in communication with the passage *d* aforesaid. The cage formed by the spray-tip *g*, wires *h*, and ring *i* is conical, and intermediate of the projecting rear portion of said ring and a rear shield *j*, constituting part of the nozzle-shank, is a conical shell of rubber or other flexible material, the rear end of same being fitted over an annular inner flange *k* of said shield.

The cut-off plate P is provided with an aperture *m*, that comes in and out of register with the nozzle-passage *e*, accordingly as there is movement of this plate on a pivot-screw *n*, engaging nozzle-shank Q, said aperture and passage being of the same diameter. Another aperture *p* in the cut-off plate diametrically opposite the one aforesaid is likewise brought in and out of register with the nozzle-shank passage *d*; but the latter being elongated at its rear end adjacent to said plate it will remain open after this plate has been swung far enough to close the former nozzle-shank passage. Therefore it requires further movement on the part of the aforesaid plate to close both passages. Indicator-marks on the nozzle-shank shield J and a pointer *r*, projecting from the periphery of the cut-off plate, as shown in Figs. 6 and 7, serve the operator to tell when both nozzle-passages are open or closed or when the inlet-passage is closed and the outlet-passage still open.

The nozzle herein described is designed for use as part of my syringe when vaginal irrigations are necessary, and its general construction is designed to obtain the best results with the least discomfort to the patient. However, various nozzles may be employed as the nature of a wound or human cavity may require, provided that such nozzles are constructed with reference to flow and return of liquid through different channels, and various means may be devised for starting and stopping the circulation of the liquid used in treatment.

The cylinder B is herein shown provided at its front end with a conical recess for reception of the nozzle above specified when the apparatus is not in use; but this is a mere matter of convenience that does not in any way affect the generic scope of my invention.

In practice the pistons F G are operated in the barrels D E to create vacuum in cylinder A and air-pressure in cylinder B, a few reciprocations of said pistons being sufficient until the liquid then under pressure is permitted to flow, after which the operation of said pistons is continued as long as necessary. The liquid under pressure having been permitted to flow from cylinder B through the nozzle into a cavity or wound, it is drawn back by suction into the cylinder A, it being understood that the mouth of said cavity or wound is properly closed about said nozzle, so as to be air and water tight. Upon completion of the operation just described the inlet-passage of the nozzle is cut off and the outlet-passage left open, so that the cavity or wound under treatment may be thoroughly drained before said nozzle is removed. Cap A' being removed, the liquid accumulated in cylinder A may be readily emptied.

It is obvious that the air-supply pump, cylinder B, and a nozzle in connection with said cylinder may be utilized as a substitute for the ordinary fountain-syringe, this construction and arrangement of parts being within the scope of my invention, the advantage being that the pressure upon the injecting liquid may be readily increased or diminished at will.

Having thus described my invention, what I claim as new, and desire to secure by Letters Patent, is—

1. A syringe comprising a pair of receptacles having openings provided with air-tight closures, means for exhausting air from one receptacle and creating air-pressure in the other, a nozzle having flow and return channels, a pipe connecting the flow-channel of the nozzle with the receptacle in which air-pressure is created, and another pipe connecting the return-channel of said nozzle with the receptacle from which air is exhausted.

2. A syringe comprising a pair of receptacles, having openings provided with air-tight closures, means for exhausting air from one receptacle and creating air-pressure in the other, a nozzle having flow and return channels, a pipe connecting the flow-channel of the nozzle with the receptacle in which air-pressure is created, another pipe connecting the return-channel of said nozzle with the receptacle from which air is exhausted, and means controlling the opening and closing of said nozzle-passages.

3. A syringe comprising a pair of receptacles having openings provided with air-tight closures, an air-exhaust pump in communication with one receptacle, and an air-supply pump in communication with the other receptacle, a handle joined to the piston-rods of both pumps, a nozzle having flow and return channels, a pipe connecting the flow-channel of the nozzle with the receptacle in which air is accumulated under pressure, and another pipe connecting the return-channel of said nozzle with the receptacle from which air is exhausted.

4. A syringe comprising a pair of receptacles having openings provided with air-tight closures, means for exhausting air from one receptacle and creating air-pressure in the other; a nozzle having a rear shield and its shank provided with flow and return passages the latter passage being in communication with a longitudinal recess in said shank, a pipe fitting the nozzle-shank in register with the flow-passage of same central of said recess, a spray-tip in connection with the outer end of the pipe and constituting part of a conical cage about the forward portion of said pipe, a conical flexible shell supported intermediate of the rear end of the cage and said shield, an apertured plate in pivotal connection with the rear of the aforesaid nozzle constituting a cut-off for said passages, a flexible pipe connecting the receptacle in which air-pressure is created with a nipple extension of the flow-aperture in the cut-off plate, and a similar pipe connecting the receptacle from which air is exhausted with a nipple extension of the return-aperture in said cut-off plate.

In testimony that I claim the foregoing I have hereunto set my hand, at Racine, in the county of Racine and State of Wisconsin, in the presence of two witnesses.

JAMES G. CHANDLER.

Witnesses:
 W. F. JACKSON,
 W. VINCENT ADAMS.